United States Patent
Karube (10) Patent No.: US 12,544,034 B2
(45) Date of Patent: Feb. 10, 2026

(54) ULTRASOUND DIAGNOSTIC APPARATUS AND OPERATION METHOD THEREOF

(71) Applicant: FUJIFILM Corporation, Tokyo (JP)

(72) Inventor: Mikihiko Karube, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 183 days.

(21) Appl. No.: 18/188,723

(22) Filed: Mar. 23, 2023

(65) Prior Publication Data

US 2023/0301620 A1   Sep. 28, 2023

(30) Foreign Application Priority Data

Mar. 25, 2022  (JP) ................ 2022-050772

(51) Int. Cl.
*A61B 8/08*   (2006.01)
*A61B 8/00*   (2006.01)

(52) U.S. Cl.
CPC ............ *A61B 8/085* (2013.01); *A61B 8/5207* (2013.01); *A61B 8/5223* (2013.01)

(58) Field of Classification Search
None
See application file for complete search history.

(56) References Cited

U.S. PATENT DOCUMENTS

| | | | | |
|---|---|---|---|---|
| 2008/0139938 A1* | 6/2008 | Yang | ...................... | G06T 7/0012 600/445 |
| 2012/0221347 A1* | 8/2012 | Reiner | ................... | G06Q 10/00 705/2 |
| 2016/0058411 A1 | 3/2016 | Yoshimura et al. | | |
| 2016/0058412 A1 | 3/2016 | Yoshimura et al. | | |
| 2016/0143620 A1* | 5/2016 | Ohta | ..................... | A61B 8/0883 600/440 |
| 2018/0330518 A1* | 11/2018 | Choi | ...................... | G06N 3/045 |
| 2019/0183462 A1 | 6/2019 | Yang et al. | | |
| 2021/0219941 A1* | 7/2021 | Tsutaoka | ................... | G06T 7/73 |
| 2021/0224996 A1 | 7/2021 | Tsutaoka | | |

(Continued)

FOREIGN PATENT DOCUMENTS

| | | | |
|---|---|---|---|
| JP | 2005-334578 A | 12/2005 | |
| JP | 2015-029619 A | 2/2015 | |

(Continued)

OTHER PUBLICATIONS

The extended European search report issued by the European Patent Office on Aug. 24, 2023, which corresponds to European Patent Application No. 23163274.6-1126 and is related to U.S. Appl. No. 18/188,723.

(Continued)

*Primary Examiner* — Katherine L Fernandez
(74) *Attorney, Agent, or Firm* — Studebaker Brackett PLLC (57) ABSTRACT

A processor of an ultrasound diagnostic apparatus acquires first ultrasound image data of a lower abdomen of a subject, derives a size of a bladder region included in the first ultrasound image data based on the first ultrasound image data, determines presence or absence of an organ, other than a bladder, that is to be examined, in the lower abdomen based on the size of the bladder region, and in a case where determination is made that there is an organ to be examined, displays first information on an examination of the organ on a display.

13 Claims, 5 Drawing Sheets

(56) References Cited

U.S. PATENT DOCUMENTS

| | | | |
|---|---|---|---|
| 2023/0181155 A1* | 6/2023 | Matsumoto | G06V 10/25 600/437 |
| 2023/0255903 A1 | 8/2023 | Nagaoka | |
| 2024/0081680 A1 | 3/2024 | Matsumoto | |
| 2025/0157068 A1 | 5/2025 | Choi | |

FOREIGN PATENT DOCUMENTS

| | | |
|---|---|---|
| JP | 2016-127971 A | 7/2016 |
| JP | 2020-519369 A | 7/2020 |
| JP | 2021-506470 A | 2/2021 |
| JP | 2021-130035 A | 9/2021 |
| WO | 2020/075575 A1 | 4/2020 |
| WO | 2020/075609 A1 | 4/2020 |
| WO | 2022/004867 A1 | 1/2022 |

OTHER PUBLICATIONS

Yamazaki et al., "Sonographic Characteristics of the Urinary Tract in Healthy Neonates", The Journal of Urology, vol. 166, No. 3, Sep. 2, 2001, pp. 1054-1057, Lippincott Williams & Wilkins, US.
"Notice of Reasons for Refusal" Office Action issued in JP 2022-050772; mailed by the Japanese Patent Office on Sep. 2, 2025.

\* cited by examiner

ULTRASOUND DIAGNOSTIC APPARATUS AND OPERATION METHOD THEREOF

CROSS-REFERENCE TO RELATED APPLICATIONS

This application is based upon and claims the benefit of priority from prior Japanese patent application No. 2022-050772, filed on Mar. 25, 2022, the entire contents of which are incorporated herein by reference.

BACKGROUND OF THE INVENTION

1. Field of the Invention

The present invention relates to an ultrasound diagnostic apparatus and an operation method thereof.

2. Description of the Related Art

JP2016-127971A describes a system that has a urinary intention input unit that inputs a urinary intention signal in a case where a person to be measured perceives a urinary intention, a measurement data recording unit that records a urine amount in the bladder calculated by an arithmetic unit, a measurement time point thereof, and a urinary intention time point corresponding to an input time point of the urinary intention signal, a urination time point recording unit that records a urination time point of the person to be measured, a urination amount calculation unit that calculates a urination amount at the urination time point based on a change in the urine amount in the bladder, and urine leakage recording unit that detects and records the urination by leakage.

JP2005-334578A describes a system that performs image processing by an ultrasound scanner system having guidance control of an initial position and a learning function to decide an examination position and a contact pressure between a scanner and a perineal region and calculate anatomical parameters before urination, during urination, and after urination.

SUMMARY OF THE INVENTION

An object of the present invention is to easily perform a necessary examination.

An ultrasound diagnostic apparatus according to an aspect of the present invention comprises a processor. The processor is configured to acquire first ultrasound image data of a lower abdomen of a subject, derive a size of a bladder region included in the first ultrasound image data based on the first ultrasound image data, determine presence or absence of an organ, other than a bladder, that is to be examined, in the lower abdomen based on the size of the bladder region, and in a case where determination is made that there is an organ to be examined, output first information on an examination of the organ from an output apparatus.

An operation method of an ultrasound diagnostic apparatus according to an aspect of the present invention comprises, by a processor of the ultrasound diagnostic apparatus, acquiring first ultrasound image data of a lower abdomen of a subject, deriving a size of a bladder region included in the first ultrasound image data based on the first ultrasound image data, determining presence or absence of an organ, other than a bladder, that is to be examined, in the lower abdomen based on the size of the bladder region, and in a case where determination is made that there is an organ to be examined, outputting first information on an examination of the organ from an output apparatus.

According to the present invention, a necessary examination can be easily performed.

DESCRIPTION OF THE PREFERRED EMBODIMENTS

Figure 1:
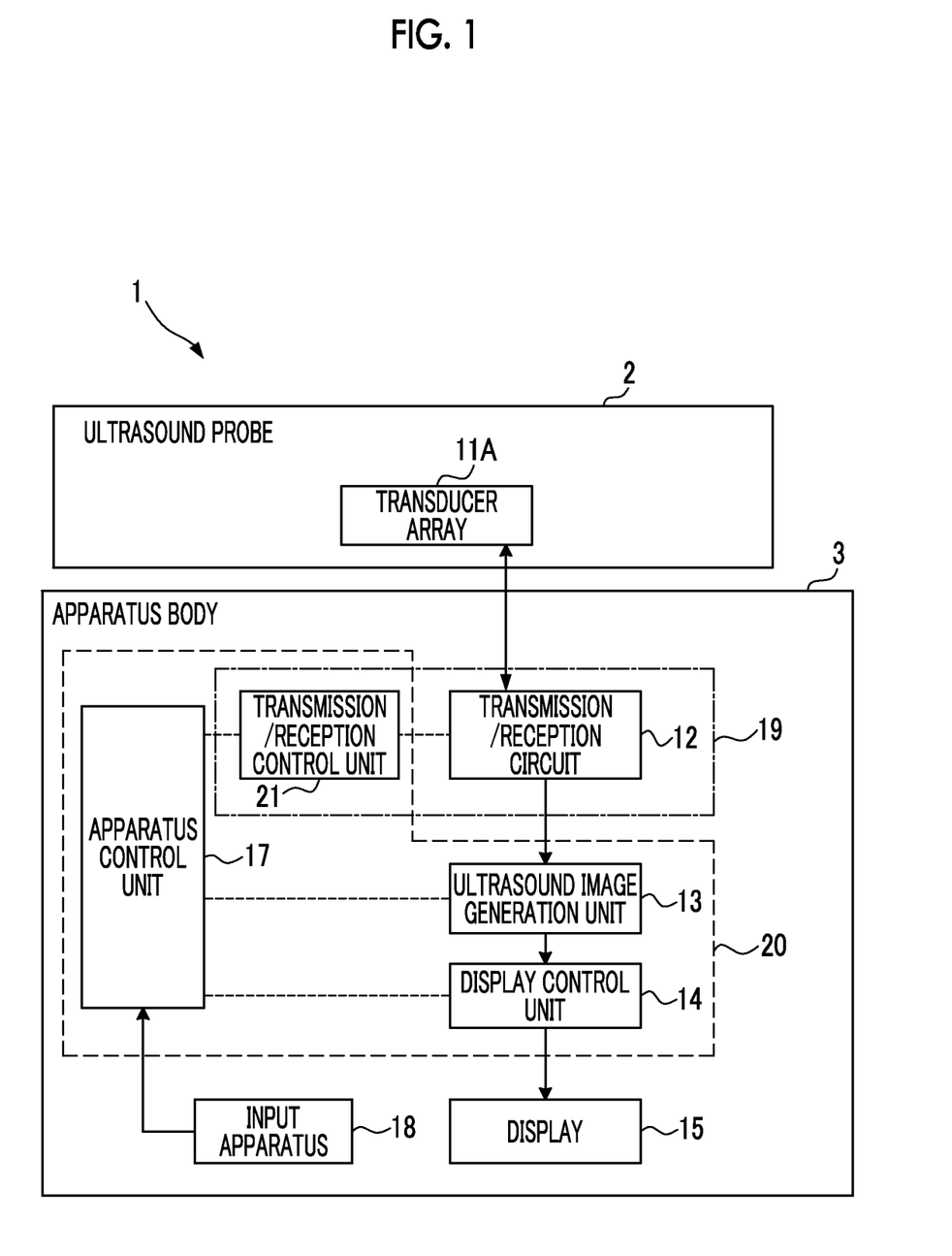
FIG. 1 is a diagram showing a schematic configuration of an ultrasound diagnostic apparatus 1 according to an embodiment of the present invention.

FIG. 1 is a diagram showing a schematic configuration of an ultrasound diagnostic apparatus 1 according to an embodiment of the present invention.

As shown in FIG. 1, the ultrasound diagnostic apparatus 1 comprises an ultrasound probe 2 and an apparatus body 3 connected to the ultrasound probe 2. The ultrasound probe 2 comprises a transducer array 11A connected to the apparatus body 3. The configuration of the transducer array 11A is not limited. The transducer array 11A is, for example, any one of types such as a so-called convex transducer array, a linear transducer array, and a sector transducer array.

The apparatus body 3 comprises a transmission/reception circuit 12 connected to the transducer array 11A, a processor 20, a display 15 such as a liquid crystal display (LCD) or an organic electroluminescence (EL) display, and an input apparatus 18 configured by apparatuses for performing an input operation by a user, such as a button, a switch, a touch pad, and a touch panel. The display 15 constitutes an output apparatus capable of outputting information.

The processor 20 is a central processing unit (CPU) which is a general-purpose processor that executes software (program) to perform various functions, a programmable logic device (PLD) whose circuit configuration is changeable after manufacturing such as a field programmable gate array (FPGA), a dedicated electric circuit which is a processor having a circuit configuration exclusively designed to execute specific processing such as an application specific integrated circuit (ASIC), or the like. The processor 20 may be configured of one processor or a combination of two or more processors having the same type or different types (for example, a plurality of FPGAs, or a combination of CPU and FPGA). In a case where the processor 20 is configured of a plurality of processors, each processor may not be in the same apparatus or may be in another place connected via a network. A hardware structure of the processor 20 is, more specifically, circuitry obtained by combining circuit elements such as a semiconductor element.

The processor 20 executes a program to function as an ultrasound image generation unit 13, a display control unit 14, an apparatus control unit 17, and a transmission/reception control unit 21. The transmission/reception circuit 12 and the transmission/reception control unit 21 constitute an ultrasound image data acquisition unit 19. Information from the input apparatus 18 is input to the apparatus control unit 17.

The transducer array 11A of the ultrasound probe 2 has a plurality of ultrasound oscillators arranged one-dimensionally or two-dimensionally. Each of these ultrasound oscillators transmits an ultrasound wave in accordance with a drive signal supplied from the transmission/reception circuit 12 and receives an ultrasound echo from a subject to output a reception signal based on the ultrasound echo. Each ultrasound oscillator is configured, for example, by forming electrodes at both ends of a piezoelectric body made of a piezoelectric ceramic represented by lead zirconate titanate (PZT), a polymer piezoelectric element represented by poly vinylidene di fluid (PVDF), a piezoelectric single crystal represented by lead magnesium niobate-lead titanate (PMN-PT), or the like.

The ultrasound image data acquisition unit 19 transmits and receives the ultrasound wave using the transducer array 11A to acquire ultrasound image data. The ultrasound image data is data in which so-called beam forming processing is performed on the reception signal generated by the transducer array 11A receiving the so-called ultrasound echo.

Under the control of the transmission/reception control unit 21, the transmission/reception circuit 12 transmits the ultrasound wave from the transducer array 11A and performs processing on the signal acquired by the transducer array 11A.

Figure 2:
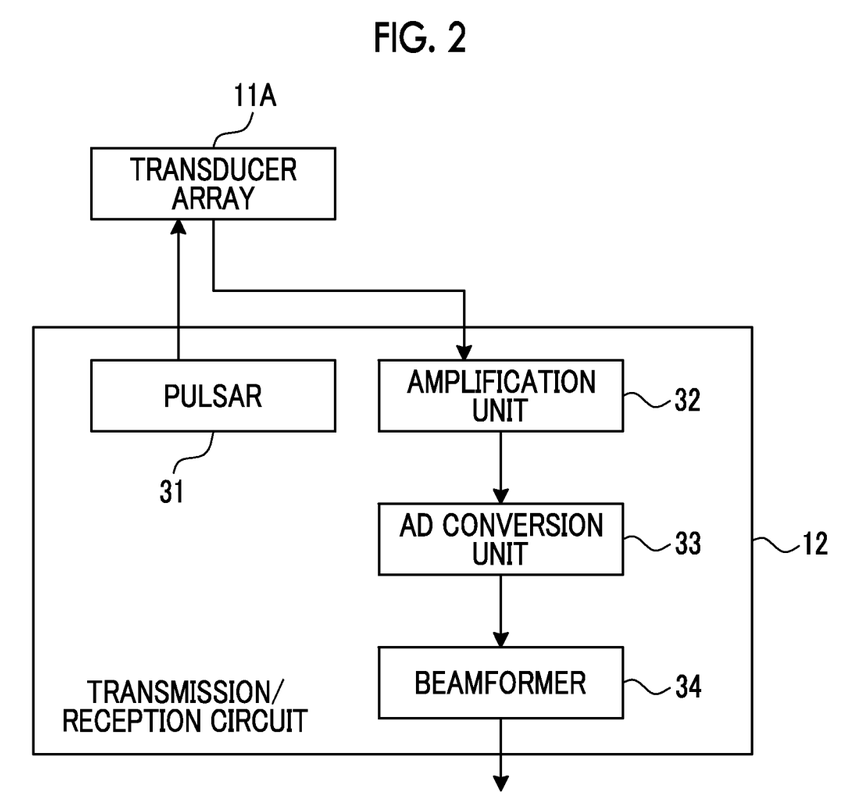
FIG. 2 is a schematic diagram showing an internal configuration of a transmission/reception circuit 12 shown in FIG. 1.

FIG. 2 is a schematic diagram showing an internal configuration of the transmission/reception circuit 12 shown in FIG. 1. The transmission/reception circuit 12 has a pulsar 31 connected to the transducer array 11A. The transmission/reception circuit 12 includes an amplification unit 32 connected to the transducer array 11A, an analog to digital (AD) conversion unit 33, and a beamformer 34.

The pulsar 31 includes, for example, a plurality of pulse generators and supplies respective drive signals to the plurality of ultrasound oscillators with a delay amount adjusted such that ultrasound waves transmitted from the plurality of ultrasound oscillators of the transducer array 11A form an ultrasound beam, based on a transmission delay pattern selected in accordance with a control signal from the transmission/reception control unit 21. As described above, in a case where a pulse-like or continuous wave-like voltage is applied to the ultrasound oscillator electrodes of the transducer array 11A, the piezoelectric body expands and contracts to generate pulse-like or continuous wave-like ultrasound waves from the respective ultrasound oscillators and the ultrasound beam is formed from a combined wave of the ultrasound waves.

The transmitted ultrasound beam is reflected by, for example, an examination target (internal organs or the like) in the subject, such as a human or an animal, and propagates toward the transducer array 11A. The ultrasound echo propagating toward the transducer array 11A in this manner is received by each of the ultrasound oscillators constituting the transducer array 11A. In this case, each of the ultrasound oscillators constituting the transducer array 11A expands and contracts by receiving the propagating ultrasound echo to generate the reception signal, which is an electric signal, and outputs the reception signal to the amplification unit 32.

The amplification unit 32 amplifies the signal input from each of the ultrasound oscillators constituting the transducer array 11A and transmits the amplified signal to the AD conversion unit 33.

The AD conversion unit 33 converts the signal transmitted from the amplification unit 32 into a digital format. The beamformer 34 performs so-called reception focus processing of applying respective delays to respective reception signals in the digital format received from the AD conversion unit 33 and of adding the respective reception signals. The ultrasound image data which is a reception signal in which the respective reception signals converted by the AD conversion unit 33 are phase-adjusted and added and focus of the ultrasound echo is narrowed down is acquired by the reception focus processing.

Figure 3:
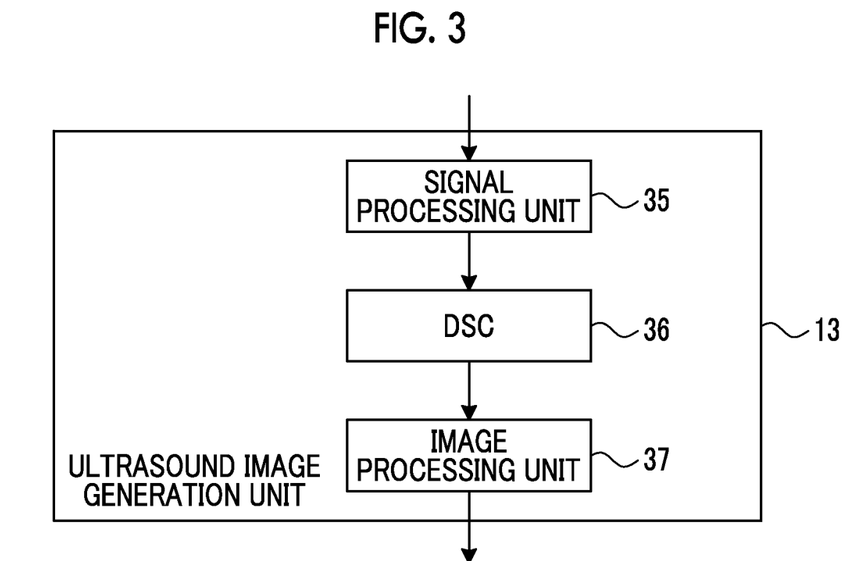
FIG. 3 is a schematic diagram showing details of an ultrasound image generation unit 13 shown in FIG. 1.

FIG. 3 is a schematic diagram showing details of the ultrasound image generation unit 13 shown in FIG. 1. The ultrasound image generation unit 13 includes a signal processing unit 35, a digital scan converter (DSC) 36, and an image processing unit 37. The signal processing unit 35 performs, on the ultrasound image data transmitted from the transmission/reception circuit 12, correction of attenuation by a distance according to a depth of a reflection position of the ultrasound wave and then envelope detection processing to generate a B-mode image signal, which is tomographic image information on a tissue in the subject.

The DSC 36 converts the B-mode image signal generated by the signal processing unit 35 into an image signal according to a normal television signal scanning method (raster conversion).

The image processing unit 37 performs various pieces of necessary image processing such as gradation processing on the B-mode image signal input from the DSC 36 and then transmits the B-mode image signal to the display control unit 14 in response to a command from the apparatus control unit 17.

Under the control of the apparatus control unit 17, the display control unit 14 performs predetermined processing on the B-mode image signal or the like generated by the ultrasound image generation unit 13 and displays the B-mode image signal on the display 15.

Figure 4:
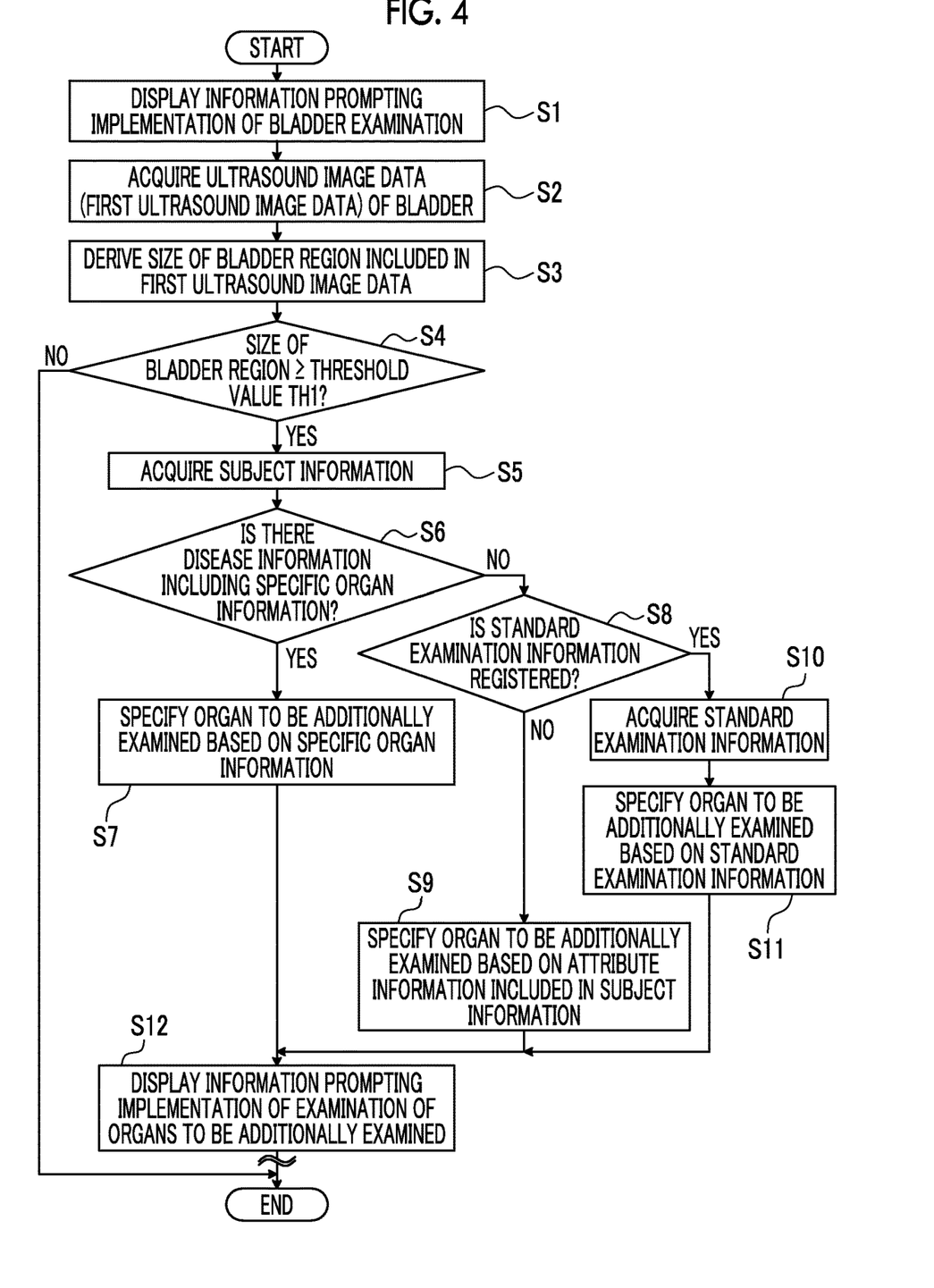
FIG. 4 is a flowchart for describing an operation of a processor 20 in a case where a lower abdomen examination mode is set.

FIG. 4 is a flowchart showing an operation of the processor 20 in a case where an examination of a lower abdomen of the subject, such as a human or an animal, (hereinafter, referred to as a lower abdomen examination) is performed by using the ultrasound diagnostic apparatus 1. The examination using the ultrasound diagnostic apparatus 1 means, using the ultrasound diagnostic apparatus 1, imaging the periphery of an organ to be examined, acquiring ultrasound image data (B-mode image signal) including the organ, and saving the ultrasound image data on a recording medium in the apparatus body 3 or a database on a network.

The lower abdomen examination includes a bladder examination for examining the bladder, which is one of organs in the lower abdomen, a prostate examination for examining the prostate, which is one of the organs in the lower abdomen, a right kidney examination for examining the right kidney, which is one of the organs in the lower abdomen, and a left kidney examination for examining the left kidney, which is one of the organs in the lower abdomen. The right kidney examination and the left kidney examination are collectively referred to as a kidney examination. The ultrasound diagnostic apparatus 1 has, for example, a lower abdomen examination mode for performing the lower abdomen examination as an operation mode. FIG. 4 is a flowchart for describing an operation of the processor 20 in a case where the lower abdomen examination mode is set. In a case where the subject is examined in the lower abdomen examination mode, identification information (name or the like) that specifies the subject is input to the ultrasound diagnostic apparatus 1 prior to the examination. In response to the input, the apparatus control unit 17 acquires subject information corresponding to the input identification information. The subject information will be described below.

First, the apparatus control unit 17 performs control of causing the display 15 to display information (for example, a text message, an icon corresponding to the bladder examination, or the like) prompting implementation of the bladder examination (step S1).

According to the information displayed on the display 15, an examiner such as a doctor or a nurse implements the bladder examination using the ultrasound probe 2. Here, ultrasound image data of a longitudinal cross section and a lateral cross section of the bladder is assumed to be saved by the bladder examination. In a case where the bladder examination ends, the examiner operates the input apparatus 18 to notify the apparatus control unit 17 of the examination end. In a case where the end of the bladder examination is detected, the apparatus control unit 17 acquires the ultrasound image data (hereinafter, referred to as first ultrasound image data) recorded on the recording medium in the bladder examination (step S2). The apparatus control unit 17 analyzes the acquired first ultrasound image data to derive a size (volume) of a bladder region included in the first ultrasound image data (step S3). The size of the bladder region derived here corresponds to an amount of urine accumulated in the bladder (residual urine amount).

Next, the apparatus control unit 17 determines whether or not there is an organ (hereinafter, referred to as organ to be additionally examined), other than the bladder, which is requested to be additionally examined, in the lower abdomen based on the size (residual urine amount) of the bladder region derived in step S3 (that is, the presence or absence of organ to be additionally examined). In other words, the apparatus control unit 17 determines whether or not at least one of the prostate examination or the kidney examination needs to be implemented based on the size of the bladder region.

Specifically, the apparatus control unit 17 determines whether or not the size of the bladder region derived in step S3 is equal to or larger than a threshold value TH1 (step S4). In a case where the determination in step S4 is NO, the apparatus control unit 17 determines that the organ to be additionally examined is not present (neither the prostate examination nor the kidney examination is requested) and ends the lower abdomen examination mode. In a case where the determination in step S4 is YES, the apparatus control unit 17 determines that the organ to be additionally examined is present (at least one of the prostate examination or the kidney examination is requested) and performs processing in step S5 and subsequent steps.

In step S5, the apparatus control unit 17 acquires the subject information on the subject being examined. The term "acquire" as used herein means to search or investigate subject information acquired from the database and stored internally before an examination start and to read the corresponding subject information. The subject information is so-called medical chart information about the subject, and includes disease information on a disease of the subject and attribute information such as age and gender of the subject. The disease information may include information such as a disease being treated, a past disease for which treatment has been ended, and a history of past examinations (information on which organ has been examined). Depending on the subject, the disease information may not be included in the subject information. The subject information is registered in advance in the database by a medical management system or the like introduced in a facility at which the ultrasound diagnostic apparatus 1 is installed. For example, as described above, the apparatus control unit 17 acquires and stores the subject information from the database before the examination start. This subject information may be recorded in advance on the recording medium inside the apparatus body 3.

After step S5, the apparatus control unit 17 determines whether or not the acquired subject information includes the disease information including information (hereinafter, referred to as specific organ information) on a specific organ (any one of prostate, right kidney, or left kidney) in the lower abdomen excluding the bladder (step S6). The specific organ information includes, for example, information indicating that the disease of the prostate, the right kidney, or the left kidney is being treated, information indicating that the treatment of the disease of the prostate, the right kidney, or the left kidney has been ended, information indicating that the examination of the prostate, the right kidney, or the left kidney has been performed, or the like.

In a case where the determination in step S6 is YES, the apparatus control unit 17 specifies the organ included in the specific organ information as the organ to be additionally examined, based on the specific organ information included in the disease information (step S7). For example, in a case where the specific organ information indicates that the treatment of the prostate has been ended, the prostate is specified as the organ to be additionally examined. Alternatively, in a case where the specific organ information indicates that the right kidney is being treated, the right kidney is specified as the organ to be additionally examined. The specific organ information may include information indicating that an operation for removing the prostate has been performed. In this case, in step S7, the apparatus control unit 17 may specify another organ other than the organ included in the specific organ information as the organ to be additionally examined.

The disease information may include a plurality of pieces of specific organ information having different organs. For example, there is a case where the disease information includes the information indicating that the right kidney is being treated and information indicating that the treatment of the prostate disease has been ended. In this case, the apparatus control unit 17 specifies an organ included in each of two pieces of specific organ information as the organ to be additionally examined. That is, in this case, each of the right kidney and the prostate is specified as the organ to be additionally examined.

In a case where the determination in step S6 is NO, the apparatus control unit 17 determines whether or not standard examination information is registered in the above database (step S8).

The standard examination information defines an examination content (examination type and order or the like) for the organ requested to be examined after the bladder examination in the lower abdomen examination mode, and is registered in the database in advance by a person or the like concerned at the facility where the ultrasound diagnostic apparatus 1 is used. The standard examination information may not be registered in the database.

The standard examination information may be registered for each gender of the subject. For example, the standard examination information for men and the standard examination information for women may be registered in the database. An example of the standard examination information for men includes first standard examination information defining that the prostate examination is performed after the bladder examination, second standard examination information defining that the prostate examination and the kidney examination are performed in this order after the bladder examination, third standard examination information defining that the kidney examination is performed after the bladder examination, or fourth standard examination information defining that the kidney examination and the prostate examination are performed in this order after the bladder examination. An example of the standard examination information for women includes fifth standard examination information defining that the right kidney examination is performed after the bladder examination, sixth standard examination information defining that the left kidney examination is performed after the bladder examination, or seventh standard examination information defining that the right kidney examination and the left kidney examination are performed in no particular order after the bladder examination.

The standard examination information is randomly determined by a person for each facility at which the ultrasound diagnostic apparatus 1 is installed, for each medical department in which the ultrasound diagnostic apparatus 1 is used, or for each ultrasound diagnostic apparatus 1, but the present invention is not limited thereto. For example, a configuration may be employed in which the apparatus control unit 17 recognizes the examination content implemented most frequently from the past examination history performed by using the ultrasound diagnostic apparatus 1 and registers the examination content in the database as the standard examination information.

In a case where the determination in step S8 is YES, the apparatus control unit 17 acquires the standard examination information from the database (step S10). In a case where the standard examination information is separately registered for men and women, in step S10, the apparatus control unit 17 may acquire the standard examination information corresponding to the gender of the subject based on the attribute information included in the subject information. The apparatus control unit 17 specifies the organ to be additionally examined based on the acquired standard examination information (step S11).

For example, in the case where the first standard examination information is acquired, the apparatus control unit 17 specifies the prostate as the organ to be additionally examined. In a case where the second standard examination information or the fourth standard examination information is acquired, the apparatus control unit 17 specifies the prostate, the right kidney, and the left kidney as the organs to be additionally examined. In a case where the third standard examination information is acquired the apparatus control unit 17 specifies the right kidney and the left kidney as the organs to be additionally examined. In a case where the fifth standard examination information is acquired, the apparatus control unit 17 specifies the right kidney as the organ to be additionally examined. In a case where the sixth standard examination information is acquired, the apparatus control unit 17 specifies the left kidney as the organ to be additionally examined. In a case where the seventh standard examination information is acquired, the apparatus control unit 17 specifies the right kidney and the left kidney as the organs to be additionally examined.

In a case where the determination in step S8 is NO, the apparatus control unit 17 specifies the organ to be additionally examined based on the attribute information included in the subject information acquired in step S5 (step S9). Specifically, in a case where the gender included in the attribute information is male, the apparatus control unit 17 specifies at least the prostate, which is an organ peculiar to male, as the organ to be additionally examined. In a case where the gender included in the attribute information is female, the apparatus control unit 17 specifies an organ other than the prostate, which is the organ peculiar to male, that is, the right kidney and the left kidney as the organs to be additionally examined.

Step S9 is processing performed in a state where the standard examination information is not present and the information on the disease of the organ in the lower abdomen is not obtained from the subject information. Therefore, in step S9, in consideration of all possibilities, in a case where the subject is male, each of the prostate, the right kidney, and the left kidney is preferably specified as the organs to be additionally examined. In a case where the subject is female, each of the right kidney and the left kidney is preferably specified as the organ to be additionally examined.

The gender, which is the attribute information of the subject, can be determined by acquiring the subject information, but can also be determined by analyzing the first ultrasound image data. For example, as a result of analyzing the first ultrasound image data, in a case where the prostate is detected from the first ultrasound image data, the apparatus control unit 17 determines that the subject is male. In a case where the prostate is not detected from the first ultrasound image data, the apparatus control unit 17 determines that the subject is female. That is, the apparatus control unit 17 can also acquire a part of the attribute information of the subject based on the first ultrasound image data.

After any one of step S7, step S9, and step S11, the apparatus control unit 17 performs control of causing the display 15 to display information prompting the implementation of the examination of one or a plurality of organs to be additionally examined specified in any one of these steps (step S12).

Figure 5:
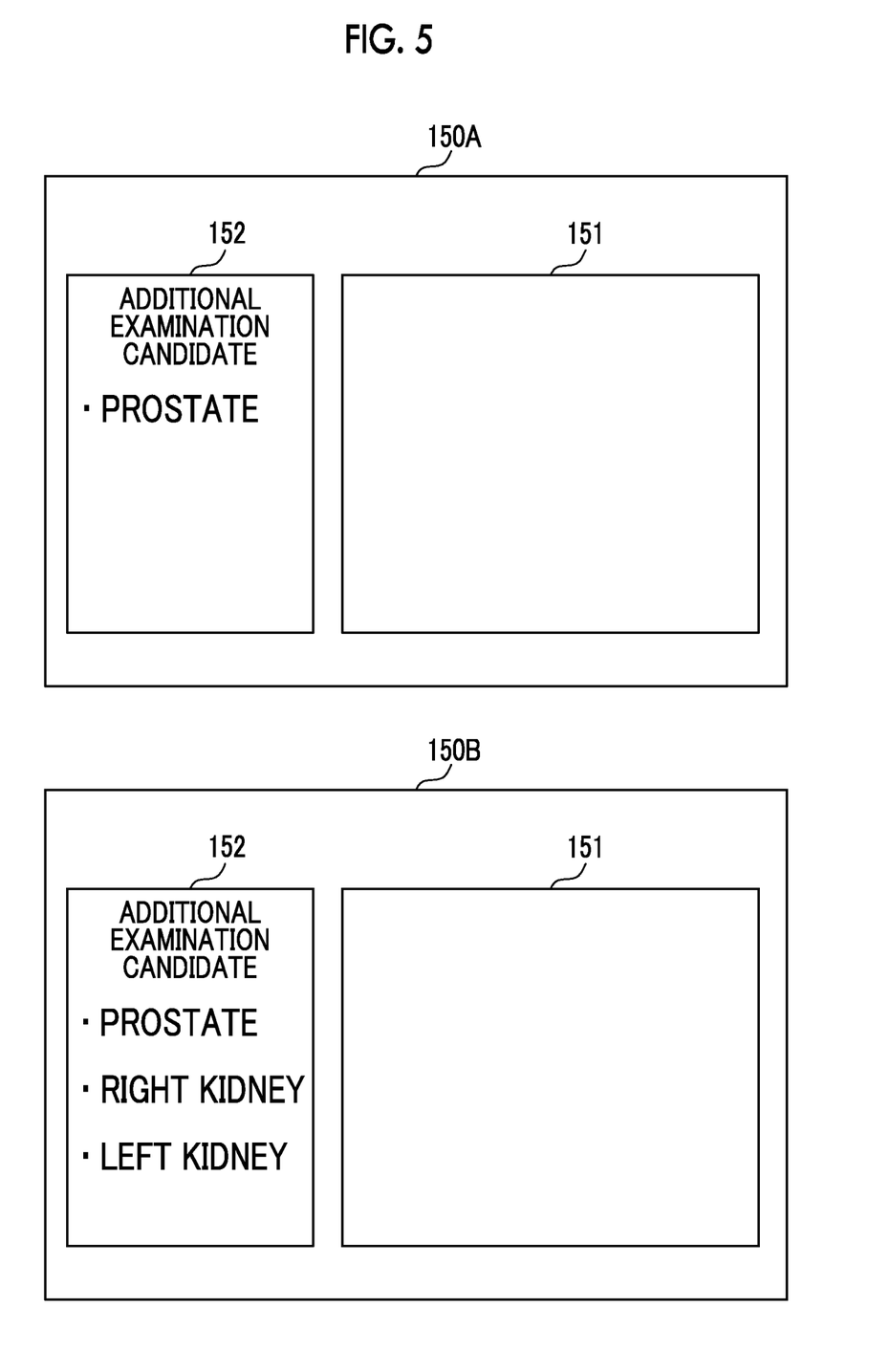
FIG. 5 is a diagram showing an example of a screen displayed on a display 15 in processing in step S12 of FIG. 4.

FIG. 5 is a diagram showing an example of a screen displayed on the display 15 in the processing in step S12 of FIG. 4. FIG. 5 shows a screen 150A and a screen 150B. Each of the screens includes a first display region 151 in which the ultrasound image data is displayed and a second display region 152 displaying information on examination candidates that need to be examined in addition to the bladder examination (specifically, name of the organ to be additionally examined and the like).

For example, in a case where the prostate is specified as the organ to be additionally examined, the apparatus control unit 17 causes the display 15 to display the screen 150A shown in FIG. 5. Further, in a case where the prostate, the right kidney, and the left kidney are specified as the organs to be additionally examined, the apparatus control unit 17 causes the display 15 to display the screen 150B shown in FIG. 5. In the processing in step S12, which is performed after step S11 in which the plurality of organs to be additionally examined are specified, the apparatus control unit 17 causes the display 15 to display a screen 150C shown in FIG. 6. On the screen 150C, information indicating examinations to be additionally requested and the order thereof is displayed in the second display region 152. Although only a text is displayed in the second display region 152, a text and an image, such as an icon, may be displayed in combination or only the image may be displayed.

Figure 6:
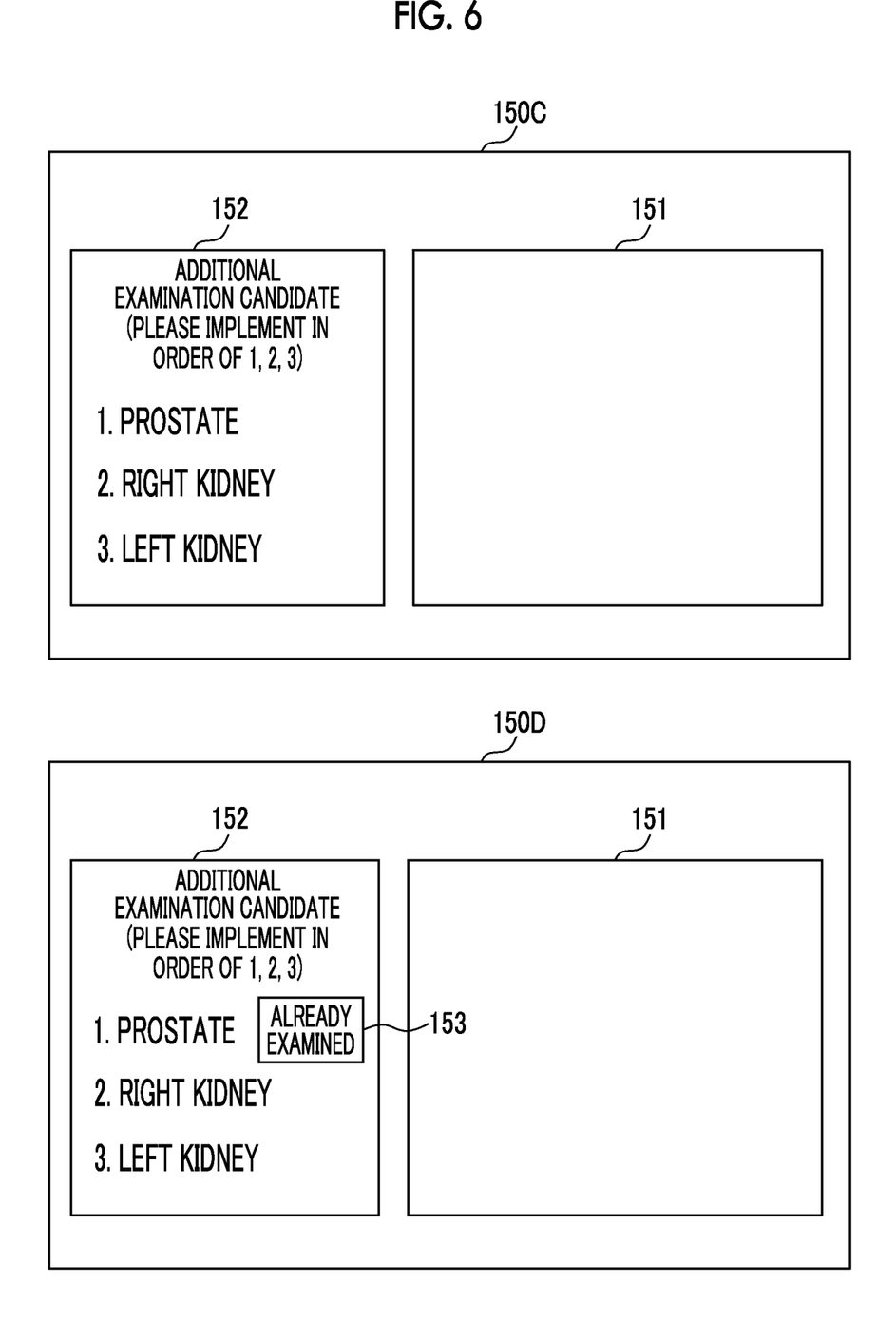
FIG. 6 is a diagram showing an example of the screen displayed on the display 15 in the processing in step S12 of FIG. 4.

The examiner implements at least one of the prostate examination, the right kidney examination, or the left kidney examination according to the information in the second display region 152 on the screen as shown in FIG. 5 or FIG. 6. In a case where each examination is ended, the apparatus control unit 17 is notified of the end. In a case where the end of all the examinations is detected, the apparatus control unit 17 ends the lower abdomen examination mode.

As described above, with the ultrasound diagnostic apparatus 1, in a case where the lower abdomen mode is set and the bladder examination is ended, the examination content requested to be additionally examined is displayed on the second display region 152 of the display 15. Therefore, even an inexperienced examiner can implement an examination necessary for diagnosis without omission and in an appropriate order. For example, even in a case where a nurse performs the examination using the ultrasound diagnostic apparatus 1 in a state where a doctor is absent, such as in home-visit nursing, the examiner can be notified of the examination necessary for diagnosis, the order thereof, and the like, based on a state of the disease of the subject, the standard examination information set in advance by the doctor or the like, or the like, and an appropriate examination can be performed.

Hereinafter, preferred examples of the operation of the processor 20 will be described.

A plurality of pieces of standard examination information may be registered for each size of the bladder region. For example, in a case where the threshold value TH1 is 50 milliliter (ml), standard examination information J1 registered corresponding to a range in which the size of the bladder region is 50 ml or more and less than 100 ml and standard examination information J2 registered corresponding to a range in which the size of the bladder region is 100 ml or more are assumed to be registered in the database. The number of examination types included in the standard examination information J1 and the standard examination information J2 is set to be different from each other. For example, the standard examination information J1 defines that the prostate examination is performed following the bladder examination. The standard examination information J2 defines that the prostate examination and the kidney examination are performed following the bladder examination.

In this case, in a case where the determination in step S8 is YES, the apparatus control unit 17 acquires the standard examination information J1 and the standard examination information J2, and specifies the organ to be additionally examined based on the size of the bladder region derived in step S3 and the acquired standard examination information J1 and standard examination information J2. Specifically, the apparatus control unit 17 specifies the organ to be additionally examined based on the standard examination information J1 in a case where the size of the bladder region is less than 100 ml, and specifies the organ to be additionally examined based on the standard examination information J2 in a case where the size of the bladder region is 100 ml or more. With the above, appropriate examination candidates can be proposed for each facility at which the ultrasound diagnostic apparatus 1 is installed, for each medical department, or for each ultrasound diagnostic apparatus 1.

The standard examination information may include threshold value designation information that designates a threshold value used in the determination in step S4. In this case, in a case where the examination mode transitions to the lower abdomen examination mode, the apparatus control unit 17 first acquires the standard examination information and sets the threshold value TH1 in accordance with the threshold value designation information included in the standard examination information. With the above, the threshold value TH1 can be flexibly set for each facility at which the ultrasound diagnostic apparatus 1 is installed, for each medical department, or for each ultrasound diagnostic apparatus 1. As a result, the appropriate examination candidates can be proposed for each facility, medical department, or apparatus.

A case is assumed in which the plurality of organs to be additionally examined are specified in step S7 and step S9. In this case, in subsequent step S12, the apparatus control unit 17 may perform control of causing the display 15 to display information prompting the implementation of the examination in order from an organ closest to the bladder among the plurality of organs to be additionally examined. With the above configuration, the examination for the organ to be additionally examined can be efficiently performed by sequentially performing the examinations according to the information displayed on the display 15. For example, since the bladder and the prostate are close to each other, in a case where the prostate examination and the kidney examination are specified as the organs to be additionally examined, the apparatus control unit 17 displays information prompting the implementation of the examination in order from the prostate examination closest to the bladder and then switching from the bladder examination to the prostate examination can be smoothly performed.

A case is assumed in which the plurality of organs to be additionally examined are specified in step S7. In this case, in subsequent step S12, the apparatus control unit 17 may cause the display 15 to display information prompting the implementation of the examination in order in which an organ of the subject being treated, among the plurality of organs to be additionally examined, is prioritized over an organ of the subject not being treated. With the above, the examination of an organ having a high risk of disease can be prioritized.

In step S7, a case is assumed in which an organ being treated is specified as the organ to be additionally examined. In this case, in subsequent step S12, the apparatus control unit 17 may display information prompting the implementation of examination of the organ to be additionally examined in a form recognizable as the examination of the organ related to a disease being treated. Specifically, a name of the organ to be additionally examined may be highlighted, or text information or an icon indicating that the treatment is being performed may be added and displayed in association with the name of the organ to be additionally examined. With the above, the examiner can easily recognize that the examination is performed for the organ related to the current disease of the subject, and thus appropriate measures such as paying more attention to the implementation of examination can be taken for the examination of the organ.

In step S11, a case is assumed in which the plurality of organs to be additionally examined are specified and the standard examination information does not particularly define the order of the examinations. In this case, in the subsequent step S12, the apparatus control unit 17 acquires information on the medical department in which the ultrasound diagnostic apparatus 1 is used, decides the priority of the examination based on this information, and displays information indicating the priority on the display 15.

For example, in a case where the prostate and the kidney are specified as the organs to be additionally examined in step S11 and the medical department is a nephrology department, the apparatus control unit 17 causes the display 15 to display information prompting the examination of the kidney with priority over the prostate. On the other hand, in a case where the medical department is a pediatric department, the apparatus control unit 17 causes the display 15 to display information prompting the examination of the prostate close to the bladder with priority over the kidney, in consideration of the examination efficiency. The apparatus control unit 17 can acquire information on the medical department by including the information in the subject information or the like. With the above, the examination efficiency can be improved or an appropriate diagnosis can be assisted.

In step S12, a case is assumed in which information prompting the implementation of only the prostate examination is displayed on the display 15. In this case, after the subsequent prostate examination is ended, the apparatus control unit 17 acquires the ultrasound image data saved in the prostate examination. The apparatus control unit 17 analyzes the acquired ultrasound image data and determines whether or not there is an organ in the lower abdomen that further needs to be additionally examined based on the analysis result. In a case where determination is made that there is an organ that needs to be additionally examined, the apparatus control unit 17 may perform control of causing the display 15 to display information prompting the implementation of the examination of the organ. Specifically, as a result of analyzing the ultrasound image data, in a case where an abnormality in the prostate (size of the prostate is equal to or larger than a threshold value (prostate is enlarged) and/or there is a malignant tumor in the prostate) is recognized, the apparatus control unit 17 performs control of causing the display 15 to display information prompting additional implementation of the right kidney examination and the left kidney examination. The prostatic enlargement and prostatic cancer can cause hydronephropathy. Therefore, a highly accurate diagnosis can be made by notifying the examiner to additionally implement the kidney examination.

After step S12, in a case where the examination of the organ to be additionally examined is ended, the apparatus control unit 17 may perform control of causing the display 15 to not display the organ to be additionally examined for which the examination is ended, or may cause the second display region 152 on the screen of the display 15 to display the organ to be additionally examined for which the examination is ended in a form in which the end of the examination is recognizable. For example, in a case where the screen 150C shown in FIG. 6 is displayed and then the prostate examination is ended, the apparatus control unit 17 displays, next to a text of "1. prostate" displayed in the second display region 152, an icon 153 indicating that the examination is already performed, as shown in a screen 150D of FIG. 6. Alternatively, a display color of this text may be lightened to be grayed out. With the above, a requested examination type can be checked even after the examination progresses, as compared with a case where the examination candidates are not displayed at the end of the examination. As a result, in a case where a re-examination is desired to be performed on an organ of the examination candidate, the organ can be easily specified.

In a case where at least one of the bladder examination, the prostate examination, the right kidney examination, or the left kidney examination is ended, the apparatus control unit 17 may perform control of analyzing the ultrasound image data saved in the ended examination, generating findings information based on the analysis result, and causing the display 15 to di splay the findings information.

For example, the apparatus control unit 17 may analyze the ultrasound image data saved in the bladder examination to determine the presence or absence of a bladder abnormality, such as bladder stones, bladder tumors, flesh formation, deposits, blood clots, and stones, or the presence or absence of peritoneal gas, and include the determination result in the findings information. In a case where the peritoneal gas is determined to be present, the apparatus control unit 17 may include, in the findings information, information indicating that the analysis result is affected by the gas or information prompting a re-examination at a timing at which there is no gas. Further, the apparatus control unit 17 may analyze the ultrasound image data saved in the bladder examination to determine an amount of protrusion of the prostate to a bladder triangular portion, and include the determination result in the findings information.

The apparatus control unit 17 may analyze the ultrasound image data saved in the prostate examination to estimate a prostate volume, and include the estimation result and severity information based on the estimation result in the findings information. For example, the findings information may include a content such as "prostate volume is 100 ml and a severe prostatic enlargement is suspected".

The apparatus control unit 17 may analyze the ultrasound image data saved in the kidney examination to determine a grade classification of hydronephropathy from a degree of urinary retention in the kidney, and include the determination result in the findings information. For example, the findings information may include a content such as "left kidney has urinary retention corresponding to grade 1 and right kidney has urinary retention corresponding to grade 3".

The apparatus control unit 17 may compare the ultrasound image data saved in the right kidney examination with the ultrasound image data saved in the left kidney examination, and include the comparison result in the findings information. For example, the findings information may include a content such as "urinary retention is more pronounced in the right kidney than in the left kidney".

The apparatus control unit 17 analyzes the ultrasound image data saved in the kidney examination to determine the presence or absence of a high echo region (stone region) inside the kidney or a low echo region (region not visualized due to blockage of ultrasound wave by stone) in a lower part of the high echo region. In a case where the high echo region and/or the low echo region is detected, the apparatus control unit 17 may include, in the findings information, information indicating that appropriate ultrasound image data has not been acquired. For example, a content such as "strong echo accompanied by acoustic shadow in kidney is recognized, and determination of hydronephropathy cannot be made" may be added to the findings information.

As shown in the screen 150D of FIG. 6, in a case where the icon 153 is displayed in correspondence with the organ on which the examination has been performed each time the examination is ended, the apparatus control unit 17 may analyze the ultrasound image data saved in the examination to determine the necessity of re-imaging (re-examination) and display information used as a determination material for re-imaging corresponding to the organ in a case where re-imaging is determined to be necessary. For example, in a case where the icon 153 is selected, a sentence such as "echo is blocked by pubic bone and right end of prostate is not visualized" may be displayed. In a case where the icon 153 is displayed in correspondence with the right kidney or the left kidney, in a case where the icon 153 is selected, a sentence such as "range from renal pelvis/cup to urinary tract of kidney is not within imaging range" may be displayed. The apparatus control unit 17 may cause the second display region 152 to display, for example, an icon indicating that the bladder examination is already performed. In this case, in a case where this icon is selected, a sentence such as "gas is recognized in abdominal cavity and visualization of organ is unclear" may be displayed. As described above, with the display of the information for determining the re-imaging on the display 15, the necessity of the re-imaging can be recognized before the generation of the findings information and thus the examination can be efficiently performed.

In a case where an instruction to end the lower abdomen examination mode is received from the examiner via the input apparatus 18 after the processing in step S12, the apparatus control unit 17 may perform control of causing the display 15 to display caution information prompting the examination of an organ for which the examination has not been completed in a case where there is an organ for which the examination has not been completed among the specified organs to be additionally examined. The apparatus control unit 17 may not display the above caution information for all the organs for which the examination has not been completed. At least in a case where the examination for the organ related to the disease of the subject being treated has not been completed among the organs to be additionally examined specified in step S7, the above caution information for prompting the implementation of this examination may be displayed. Accordingly, with prevention of the end of the lower abdomen examination without performing the examination considered to be necessary for the diagnosis, the diagnosis accuracy can be improved. Further, even in a case where the examination cannot be completed due to a posture of the subject or the like, the above caution information can be used to suggest to the examiner to change the posture of the subject to perform the examination, and thus non-implementation of the examination can be prevented.

In the above description, the apparatus control unit 17 performs control of causing the display 15 to display the information prompting the examination of the organ to be additionally examined. However, the apparatus control unit 17 may perform control of providing a speaker instead of or in addition to the display 15 and of outputting the above information from the speaker. Further, as a modification example, the apparatus control unit 17 may perform control of transmitting the above information to an electronic device such as a smartphone or a tablet-type terminal connectable to the apparatus body 3 by wire or wirelessly and of outputting the above information from an output apparatus such as a display or a speaker in the electronic device.

The overall configuration of the ultrasound diagnostic apparatus 1 described so far can be modified in various ways. For example, a first configuration may be employed in which the transmission/reception circuit 12 is included in the ultrasound probe 2. Further, a second configuration may be employed in which the transmission/reception circuit 12 and the ultrasound image generation unit 13 are included in the ultrasound probe 2. In the case of the second configuration, the apparatus body 3 may be a general-purpose device such as a smartphone or a tablet terminal instead of a dedicated device. Further, in any of these configurations, connection between the ultrasound probe 2 and the apparatus body 3 is not limited to wired connection and may be wireless connection.

As described above, at least the following matters are described in the present specification.

(1) An ultrasound diagnostic apparatus comprising:
a processor,
in which the processor is configured to:
acquire first ultrasound image data of a lower abdomen of a subject;
derive a size of a bladder region included in the first ultrasound image data based on the first ultrasound image data;
determine presence or absence of an organ, other than a bladder, that is to be examined, in the lower abdomen based on the size of the bladder region; and
in a case where determination is made that there is an organ to be examined, output first information on an examination of the organ from an output apparatus.

(2) The ultrasound diagnostic apparatus according to (1),
in which the processor is configured to:
acquire subject information on the subject;
in a case where determination is made that there is an organ to be examined, specify a first organ to be examined among organs in the lower abdomen based on the subject information; and
output information prompting an examination of the first organ as the first information from the output apparatus.

(3) The ultrasound diagnostic apparatus according to (2),
in which the processor is configured to, in a case where the subject information includes information on a disease related to a specific organ other than the bladder in the lower abdomen, specify at least the specific organ as the first organ.

(4) The ultrasound diagnostic apparatus according to (2) or (3),
in which the processor is configured to, in a case where a plurality of the first organs are present, output information prompting an examination of an organ having a distance close to the bladder with priority as the first information.

(5) The ultrasound diagnostic apparatus according to any one of (2) to (4),
in which the processor is configured to:
acquire standard examination information that defines an examination content for an organ to be examined after the bladder is examined; and
in a case where information on a disease related to an organ other than the bladder in the lower abdomen is not able to be acquired from the subject information, specify the first organ based on the standard examination information.

(6) The ultrasound diagnostic apparatus according to (5),
in which the processor is configured to, in a case where a plurality of the first organs are present, output, as the first information, information prompting examinations of the plurality of first organs in an order based on information on a medical department in which the ultrasound diagnostic apparatus is used.

(7) The ultrasound diagnostic apparatus according to (5) or (6),
in which the processor is configured to:
acquire a plurality of pieces of the standard examination information;
in a case where the size of the bladder region is equal to or larger than a threshold value, determine that there is an organ, other than the bladder, that is to be examined, in the lower abdomen; and
in a case where determination is made that there is an organ to be examined, specify the first organ based on the size of the bladder region and the plurality of pieces of the standard examination information.

(8) The ultrasound diagnostic apparatus according to (5) or (6),
in which the processor is configured to:
in a case where the size of the bladder region is equal to or larger than a threshold value, determine that there is an organ, other than the bladder, that is to be examined, in the lower abdomen; and
change the threshold value based on the standard examination information.

(9) The ultrasound diagnostic apparatus according to any one of (5) to (8),
in which the processor is configured to, in a case where the information on the disease is not able to be acquired and the standard examination information is not able to be acquired, specify the first organ based on the first ultrasound image data or attribute information of the subject included in the subject information.

(10) The ultrasound diagnostic apparatus according to any one of (1) to (9),
in which the output apparatus is a display, and the processor is configured to, in a case where the first information is displayed on the display and then the organ to be examined is examined, distinguishingly display the first information for an organ that has been examined and an organ that has not been examined.

(11) The ultrasound diagnostic apparatus according to any one of (1) to (10),
in which the processor is configured to, in a case where the first information is output and then the organ to be examined is examined, perform analysis on ultrasound image data obtained in the examination, and output information based on a result of the analysis from the output apparatus.

(12) The ultrasound diagnostic apparatus according to any one of (1) to (11),
in which the processor is configured to, in a case where the first information is output and then the examination of the organ to be examined is not completed, output information prompting the examination from the output apparatus.

(13) The ultrasound diagnostic apparatus according to any one of (1) to (12),
in which the processor is configured to, in a case where the first information is output and then all organs to be examined are examined, generate findings information based on the first ultrasound image data and ultrasound image data obtained by the examination, and output the findings information from the output apparatus.

(14) An operation method of an ultrasound diagnostic apparatus, the operation method comprising:
by a processor of the ultrasound diagnostic apparatus,
acquiring first ultrasound image data of a lower abdomen of a subject;
deriving a size of a bladder region included in the first ultrasound image data based on the first ultrasound image data;
determining presence or absence of an organ, other than a bladder, that is to be examined, in the lower abdomen based on the size of the bladder region; and
in a case where determination is made that there is an organ to be examined, outputting first information on an examination of the organ from an output apparatus.

EXPLANATION OF REFERENCES

1: ultrasound diagnostic apparatus
2: ultrasound probe
3: apparatus body
11A: transducer array
12: transmission/reception circuit
13: ultrasound image generation unit
14: display control unit
15: display
17: apparatus control unit
18: input apparatus
19: ultrasound image data acquisition unit
20: processor
21: transmission/reception control unit
31: pulsar
32: amplification unit
33: AD conversion unit
34: beamformer
35: signal processing unit
36: DSC
37: image processing unit
150A, 150B, 150C, 150D: screen
151: first display region
152: second display region
153: icon
21

What is claimed is:
1. An ultrasound diagnostic apparatus comprising:
a processor and an ultrasound probe that transmits an ultrasound wave to a subject and receives an ultrasound echo from the subject to output a reception signal,
wherein the processor is configured to:
acquire first ultrasound image data of a lower abdomen the subject based on the reception signal;
derive a size of a region of a bladder included in the first ultrasound image data based on the first ultrasound image data;
determine whether examination of one or more first organs, other than the bladder, is to be performed based on the derived size of the region of the bladder, wherein:
in response to it being determined that examination of the one or more first organs is to be performed, based on the derived size of the region of the bladder being equal to or greater than a threshold:
acquire subject information on the subject;
specify the one or more first organs to be examined in the lower abdomen based on the acquired subject information;
output first information prompting examination of the one or more first organs from an output apparatus; and
acquire second ultrasound image from the one or more first organs by way of the ultrasound probe; and
in response to it being determined that no examination of the one or more first organs is to be performed, based on the size of the region of the bladder being less than the threshold, conclude examination of the lower abdomen of the subject.

2. The ultrasound diagnostic apparatus according to claim 1,
wherein the processor is configured to, in a case where the subject information includes information on a disease related to a specific organ other than the bladder in the lower abdomen, specify at least the specific organ as the one or more first organs.

3. The ultrasound diagnostic apparatus according to claim 1,
wherein the processor is configured to, in response to a plurality of first organs being present as the one or more first organs, output information prompting an examination of an organ having a closest distance to the bladder with priority as the first information.

4. The ultrasound diagnostic apparatus according to claim 1,
wherein the processor is configured to:
acquire standard examination information that defines an examination content for an organ requested to be examined after the bladder is examined; and,
in response to information on a disease related to the organ other than the bladder in the lower abdomen being not able to be acquired from the subject information, specify the one or more first organs based on the standard examination information.

5. The ultrasound diagnostic apparatus according to claim 4,
wherein the processor is configured to, in response to a plurality of first organs being present as the one or more first organs, output, as the first information, information prompting examinations of the plurality of first organs in an order based on information on a medical department in which the ultrasound diagnostic apparatus is used.

6. The ultrasound diagnostic apparatus according to claim 4,
wherein the processor is configured to:
acquire a plurality of pieces of the standard examination information;
in response to the size of the region of the bladder being equal to or larger than the threshold, determine that there is the organ, other than the bladder, that is to be examined in the lower abdomen; and,
in response to it being determined that there is the organ to be examined, specify the one or more first organs based on the size of the region of the bladder and the plurality of pieces of the standard examination information.

7. The ultrasound diagnostic apparatus according to claim 4,
wherein the processor is configured to:
in response to the size of the region of the bladder being equal to or larger than the threshold, determine that there is the organ, other than the bladder, that is to be examined, in the lower abdomen; and
change the threshold based on the standard examination information.

8. The ultrasound diagnostic apparatus according to claim 4,
wherein the processor is configured to, in response to the information on the disease being not able to be acquired and the standard examination information is not able to be acquired, specify the one or more first organs based on the first ultrasound image data or attribute information of the subject included in the subject information.

9. The ultrasound diagnostic apparatus according to claim 1,
wherein the output apparatus is a display, and
the processor is configured to, in response to the first information being displayed on the display and then the organ to be examined is examined, distinguishingly display the first information for an organ that has been examined and an organ that has not been examined.

10. The ultrasound diagnostic apparatus according to claim 1,
wherein the processor is configured to, in response to the first information being output and then the one or more first organs to be examined is examined, perform analysis on ultrasound image data obtained in the examination, and output information based on a result of the analysis from the output apparatus.

11. The ultrasound diagnostic apparatus according to claim 1,
wherein the processor is configured to, in response to the first information being output and then the examination of the one or more first organs to be examined is not completed, output information prompting the examination from the output apparatus.

12. The ultrasound diagnostic apparatus according to claim 1,
wherein the processor is configured to, in response to the first information being output and then all organs to be examined are examined, generate findings information based on the first ultrasound image data and ultrasound image data obtained by the examination, and output the findings information from the output apparatus.

13. An operation method of an ultrasound diagnostic apparatus including a processor and an ultrasound probe that transmits an ultrasound wave to a subject and receives an ultrasound echo from the subject to output a reception signal, the operation method comprising:
by the processor,
acquiring first ultrasound image data of a lower abdomen the subject based on the reception signal;
deriving a size of a bladder region included in the first ultrasound image data based on the first ultrasound image data;
determining whether examination of one or more first organs, other than the bladder, is to be performed based on the derived size of the region of the bladder,
wherein:
in response to it being determined that examination of the one or more first organs is to be performed, based on the derived size of the region of the bladder being equal to or greater than a threshold:
acquiring subject information on the subject;
specifying the one or more first organs to be examined in the lower abdomen based on the acquired subject information;
outputting first information prompting examination of the one or more first organs from an output apparatus; and
acquiring second ultrasound image from the one or more first organs by way of the ultrasound probe; and
in response to it being determined that no examination of the one or more first organs is to be performed, based on the size of the region of the bladder being less than the threshold, concluding examination of the lower abdomen of the subject.

* * * * *